United States Patent
Piezunka (10) Patent No.: US 9,290,275 B2
(45) Date of Patent: Mar. 22, 2016

(54) MOUNTING DEVICE FOR MOUNTING AN ENERGY SUPPLY DEVICE ON A STRUCTURAL COMPONENT OF AN AIRCRAFT AND AIRCRAFT WITH A MOUNTING DEVICE

(75) Inventor: Volker Piezunka, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 858 days.

(21) Appl. No.: 12/990,260

(22) PCT Filed: Apr. 29, 2009

(86) PCT No.: PCT/EP2009/003119
§ 371 (c)(1),
(2), (4) Date: Oct. 29, 2010

(87) PCT Pub. No.: WO2009/132846
PCT Pub. Date: Nov. 5, 2009

(65) Prior Publication Data
US 2011/0049291 A1    Mar. 3, 2011

Related U.S. Application Data

(60) Provisional application No. 61/048,571, filed on Apr. 29, 2008.

(30) Foreign Application Priority Data

Apr. 29, 2008 (DE) .......... 10 2008 021 431

(51) Int. Cl.
*B64D 41/00* (2006.01)

(52) U.S. Cl.
CPC .......... *B64D 41/00* (2013.01); *B64D 2041/002* (2013.01)

(58) Field of Classification Search
CPC ...... B64C 27/001; B64D 33/04; B64D 41/00; B64D 2041/002; F16F 15/00; F16F 15/08
USPC .......... 60/796; 244/17.27, 53 R, 54; 248/557, 248/555, 554
See application file for complete search history.

(56) References Cited

U.S. PATENT DOCUMENTS 2,965,338 A    12/1960  McLean
4,274,510 A     6/1981  Mouille et al.
(Continued)

FOREIGN PATENT DOCUMENTS

CN    1174798 A    3/1998
DE    69012071 T2  4/1995
(Continued)

OTHER PUBLICATIONS

International Preliminary Report on Patentability and Written Opinion for corresponding application PCT/EP2009/003119, dated Nov. 9, 2010.

(Continued)

*Primary Examiner* — Valentina Xavier
(74) *Attorney, Agent, or Firm* — Ingrassia Fisher & Lorenz, P.C.

(57) ABSTRACT

An aircraft featuring: a fuselage with a fuselage section, an energy supply device, at least two supporting devices that are arranged on the fuselage section and serve for fastening the energy supply device, a mounting device for mounting an energy supply device on a structural component of an aircraft and an aircraft with a mounting device, as well as to a mounting device for mounting an energy supply device on a structural component of an aircraft and to an aircraft with a mounting device.

21 Claims, 5 Drawing Sheets

(56) References Cited

U.S. PATENT DOCUMENTS

| | | | |
|---|---|---|---|
| 5,078,342 A | 1/1992 | Langley | |
| 5,275,357 A | 1/1994 | Seelen | |
| 5,277,382 A | 1/1994 | Seelen | |
| 5,303,880 A | 4/1994 | Cencula | |
| 5,351,930 A * | 10/1994 | Gwinn et al. | 248/557 |
| 5,860,623 A | 1/1999 | Dunstan | |
| 5,871,177 A | 2/1999 | Demouzon | |
| 6,059,227 A * | 5/2000 | Le Blaye et al. | 244/54 |
| 6,474,596 B1 | 11/2002 | Cousin | |
| 6,988,692 B2 | 1/2006 | Pasquer | |
| 7,021,585 B2 | 4/2006 | Loewenstein | |
| 7,527,220 B2 | 5/2009 | Dron | |
| 7,566,029 B2 | 7/2009 | Dron | |
| 2004/0251379 A1 | 12/2004 | Pasquer | |
| 2005/0067528 A1 | 3/2005 | Loewenstein | |
| 2005/0269446 A1 | 12/2005 | Dron | |
| 2006/0219841 A1 | 10/2006 | Dron | |
| 2007/0056292 A1 | 3/2007 | Michalski, Jr. et al. | |
| 2011/0049291 A1 | 3/2011 | Piezunka | |

FOREIGN PATENT DOCUMENTS

| | | | |
|---|---|---|---|
| DE | 69803951 | T2 | 11/2002 |
| DE | 69804758 | T2 | 11/2002 |
| DE | 69724384 | T2 | 6/2004 |
| DE | 60006769 | T2 | 9/2004 |
| DE | 602004000283 | T2 | 8/2006 |
| DE | 602005000139 | T2 | 8/2007 |
| DE | 602004002891 | T2 | 9/2007 |
| DE | 102008021431 | A1 | 11/2009 |
| EP | 1707487 | A1 | 10/2006 |
| EP | 1764306 | A2 | 3/2007 |
| WO | 0240347 | A2 | 5/2002 |
| WO | 2006108028 | A2 | 10/2006 |
| WO | 2009132846 | A2 | 11/2009 |

OTHER PUBLICATIONS

International Search Report for corresponding application PCT/EP2009/003119, dated Feb. 12, 2010.

Chinese Office Action for corresponding Chinese Patent Application No. 200980115569.X, dated Oct. 10, 2012.

State Intellectual Property Office of the People's Republic of China, Office Action in Chinese Patent Application No. 2014033101053670 mailed Apr. 3, 2015.

* cited by examiner

MOUNTING DEVICE FOR MOUNTING AN ENERGY SUPPLY DEVICE ON A STRUCTURAL COMPONENT OF AN AIRCRAFT AND AIRCRAFT WITH A MOUNTING DEVICE

CROSS REFERENCE TO RELATED APPLICATIONS

This application claims priority to PCT Application No. PCT/EP2009/003119, filed Apr. 29, 2009; which claims priority to German Patent Application No. DE 10 2008 021 431.0, filed Apr. 29, 2008, and claims the benefit to U.S. Provisional Patent Application No. 61/048,571, filed Apr. 29, 2008, the entire disclosures of which applications are hereby incorporated by reference.

BACKGROUND

The invention pertains to a mounting device for mounting an energy supply device on a structural component of an aircraft and to an aircraft with a mounting device.

Document DE 698 04 758 T2 describes a mounting device for mounting a propulsion engine on a structural component of an aircraft.

A suspension device for ancillary equipment of an aircraft that is intended for achieving a vibration compensation is known from WO 2006/108028. The suspension device may be formed of a plurality of mounting rods of low rigidity, wherein the rigidity is adapted to the vibrations of the ancillary equipment by means of elastomer bearings. An improvement in the operational reliability of the entire arrangement is achieved by multiplying the mounting rods.

Mounting devices for ancillary equipment of an aircraft are furthermore known from U.S. Pat. No. 2,965,338 and U.S. Pat. No. 4,274,510.

SUMMARY

It is the objective of the invention to develop a mounting device for mounting an energy supply device on a structural component of an aircraft and an aircraft with a mounting device that make it possible to improve the reliability of the mounting and only require few reinforcement measures on the aircraft structure.

This objective is attained with the characteristics of one or more embodiments disclosed and/or described herein. Other embodiments are also disclosed and described herein.

According to the invention, a mounting device for mounting an energy supply device on a structural component of an aircraft is proposed, wherein said mounting device features at least two supporting devices for fastening the energy supply device. The mounting device features a catching device or a mounting safety in general that consists of a first holding device arranged on the energy supply device, a second holding device arranged on at least the fuselage section or at least on a first of the supporting devices and a connecting device for coupling the holding devices. The arrangement of the first and the second holding device may be realized by means of a revolute joint or a bolt/eyelet connection. The catching device is designed and suitable for holding the energy supply device and forms a safety load path in case breakage occurs on the first supporting device. When it forms the safety load path, the connecting device is designed such that it has a length that is greater than the distance between the first holding device and the second holding device in the normal state of the first supporting device by a certain amount, and that the connecting device allows operational motions and/or vibrational motions of the energy supply device relative to the structural component without damping in the normal state of the first supporting device.

If breakage occurs on the first supporting device, the catching device holds the energy supply device in such a way that it only can—depending on the demands on the overall aircraft system—inflict a predetermined or permissible maximum effect or maximum damage due to the thusly created mobility of the energy supply device. The maximum damage may, e.g., also be defined such that the energy supply device cannot contact the adjacent structural component of the aircraft. In another exemplary embodiment, the maximum damage may be defined such that the energy supply device may damage, but not puncture the adjacent structural component of the aircraft in this state. In another exemplary embodiment, it may also be permitted that the energy supply device punctures the adjacent structural component of the aircraft in this state. This exemplary embodiment can be used, in particular, if the structural component of the aircraft is realized in a double-walled fashion, wherein the energy supply device can only puncture the inner wall of the structural component that faces the energy supply device in this case. Due to the inventive solution of the catching device, the energy supply device is held on the structural component, on which it is mounted by means of the supporting devices in the normal state, in any case if the respective supporting device assigned to the energy supply device breaks or fails.

The operational motions are motions of the energy supply device relative to the supporting devices or the fuselage component that primarily occur due to external loads acting upon the aircraft during its operation. Likewise, vibrational motions are motions of the energy supply device relative to the supporting devices or the fuselage component that occur during the operation.

The supporting devices may be arranged, in particular, such that they accommodate the energy supply device in an upright fashion, i.e., the energy supply device is positioned above the region of the fuselage supporting the energy supply device. In this case, the supporting devices may be arranged, in particular, on the upper side of the fuselage. "Above" means that the energy supply device is positioned opposite to the direction of the force of gravity when the aircraft is located on the ground.

The catching device may be realized in such a way that it can form the safety load path that acts between the structural component and the energy supply device and is capable of transmitting at least 500 N.

The catching device may furthermore be realized in such a way that it is relaxed in the normal state of the respective supporting device and tensioned or stretched when it forms the load path. In this case, the maximum length of the catching device between the fastening point on the energy supply device and the fastening point on the structural component is, when the catching device forms the safety load path after breakage of the first supporting device, greater than the distance between these fastening points in the operative state of the first supporting device with the first holding device and the second holding device by an amount of at least 5%.

The catching device may be realized, in particular, in such a way that the length of the catching device between the fastening point on the energy supply device and the fastening point on the structural component lies between 100 mm and 500 mm in the operative state of the first supporting device with the first holding device, and that the amount, by which this length is shorter than the maximum length of the catching device between the fastening points when it forms the safety load path or after breakage of the first supporting device, lies between 1 mm and 100 mm.

At least one of the supporting devices may feature a damping device for damping vibrations of the energy supply device relative to the fuselage component. The damping device may feature, in particular, a damper housing in this case. The damping device may feature, in particular, a damper housing with a damper element integrated therein, and at least one of the supporting devices may feature a fastening part on the fuselage side in order to mount the damper housing on the fuselage section and a supporting part that couples the damper housing to the energy supply device. In this case, the first holding device may be formed of a first connecting part and the second holding device to be formed of a second connecting part, wherein the first connecting part is fastened on at least one of the supporting devices and/or on the damper housing and/or the fuselage section and the second connecting part is fastened on the energy supply device, and wherein the connecting parts are coupled in such a way that they can be moved relative to one another.

According to another exemplary embodiment, the damping device may feature a damper housing with a damper element integrated therein, and at least one of the supporting devices may feature a supporting part on the fuselage side in order to mount the damper housing on the fuselage section and a fastening part that couples the damper housing to the energy supply device. In this case, the first holding device in the form of a first connecting part and the second holding device may be formed of a second connecting part, wherein the first connecting part is fastened on the energy supply device and the second connecting part is fastened on at least one of the supporting devices and/or the damper housing and/or the fuselage section, and wherein the connecting parts are coupled in such a way that they can be moved relative to one another.

According to one exemplary embodiment of the connecting device, the first connecting part and the second connecting part can be coupled to one another by means of a bolt connection.

According to another exemplary embodiment of the connecting device, one of the connecting parts may feature a slotted element for movably accommodating the other connecting part.

According to another exemplary embodiment of the connecting device, the connecting device of the catching device or arresting device may be realized at least sectionally flexible and, in particular, in a band-shaped fashion. In this case, the connecting device of the arresting device may feature, in particular, a flexible band. The flexible band may be formed of interlaced metal wires.

The flexible section of the connecting device may also be formed of a chain and/or a holding cable.

According to another exemplary embodiment of the connecting device, the flexible section may be realized such that its length is variable and formed, in particular, of an expandable or elastic material such as, e.g., rubber. The expandable or elastic material may, in particular, be jacketed in order to define a maximum length of the section.

According to another exemplary embodiment of the connecting device, the connecting device may be realized such that its length is variable and formed of a telescopic tube with a stopping device, by means of which the length of the telescopic tube is limited to a maximum length.

In another exemplary embodiment of the connecting device, the connecting device may be formed of a sectional rod, the sections of which are coupled in succession referred to their length.

It would furthermore be possible to realize an exemplary embodiment of the connecting device, in which the connecting device is formed of a lever arrangement, the levers of which are arranged such that the lever arrangement can expand and contract in an accordion-like fashion.

According to another aspect of the invention, a mounting device for mounting an energy supply device on a structural component of an aircraft is proposed, wherein said mounting device features at least one supporting device for fastening the energy supply device and said supporting device is provided with a supporting device for transmitting the supporting forces occurring between the structural component and the energy supply device. The supporting device may be formed, in particular, of two arms and a central bolt. The mounting device furthermore features a mounting safety that allows operational motions and/or vibrational motions of the energy supply device relative to the structural component in one translatory direction or two translatory directions, wherein the permitted relative motions are realized such that the mounting safety holds the energy supply device within a predetermined range of motion, in which the energy supply device can only inflict a predetermined, above-described maximum effect upon the surrounding structure if breakage of the supporting device occurs in a predetermined load path region.

The supporting device may be realized in accordance with one of the exemplary embodiments thereof described herein.

The mounting device may be realized, in particular, such that the relative motions lie between 1 mm and 30 mm.

In these exemplary embodiments, at least one supporting device may feature a damping device for damping vibrations of the energy supply device relative to the fuselage section.

The mounting device may be realized with a mounting safety that features a first connecting part and a second connecting part, wherein the first connecting part is fastened on at least one of the supporting devices and/or the damper housing and/or the fuselage section and the second connecting part is fastened on the energy supply device, and wherein the connecting parts are coupled in such a way that they can be moved relative to one another. In this case, the connecting parts may be coupled to one another, in particular, by means of a bolt-eyelet connection such that they can be moved relative to one another.

According to the invention, the mounting device may generally be realized, in particular, together with the mounting safety such that the at least one supporting device provides a mounting of the energy supply device in two space coordinates and allows one degree of freedom in one space coordinate. In this case, the mounting safety may be realized such that it forms a load path in the direction of the degree of freedom of the supporting device if breakage of the supporting device of a supporting device occurs in a predetermined load path region. Protection against breakage of a key component on the supporting device can be provided in this fashion. In this exemplary embodiment, the mounting safety supplements the mounting properties of the supporting device such that an effective safety function can be fulfilled.

In these exemplary embodiments of the invention, the supporting device may be formed, in particular, of a fastening part on the fuselage side, a supporting part arranged thereon and at least two supporting rods arranged thereon, wherein a bearing part is respectively arranged on the ends of the supporting rods and respectively forms a spherical bearing together with a corresponding bearing point of the energy supply device.

According to another aspect of the invention, a mounting device for mounting an energy supply device on a structural component of an aircraft is proposed, with said mounting device featuring at least two supporting devices for mounting the energy supply device, wherein a first supporting device forms a mounting point for the energy supply device and mounts this energy supply device in all three space coordinates, wherein a catching device suitable for holding the energy supply device and for forming a safety load path in case breakage occurs on the first holding device is assigned to the first supporting device, and wherein the connecting device has, when a safety load path is formed, a length that is greater by a certain amount than the distance between the first holding device and the second holding device in the normal state of the first supporting device and the connecting device allows operational motions and/or vibrational motions of the energy supply device relative to the structural component without damping in the normal state of the first supporting device, wherein at least one second supporting device provides a mounting of the energy supply device in two space coordinates and allows one degree of freedom in one space coordinate, and wherein a mounting safety is assigned to the second supporting device and suitable for forming a load path in the direction of the degree of freedom of the supporting device if breakage of the supporting device of a supporting device occurs in a predetermined load path region.

According to another aspect of the invention, an aircraft is proposed, with said aircraft featuring:
a fuselage with the fuselage section that features a space,
an energy supply device arranged in the space, and
a mounting device that is realized in accordance with one of the exemplary embodiments of the invention.

With respect to the structural integration of the energy supply device into the aircraft or its support structure that is also referred to as "airframe," at least one of the supporting devices may be arranged on a structural component or on the fuselage section of the support structure or on a [text missing] on the support structure. In this case, the supporting device may feature, in particular, a flange that is arranged on the fuselage section. The structural component or the fuselage section may be a supporting component. The supporting component may consist, in particular, of a frame.

The energy supply device may be arranged, in particular, on a fuselage section outside the pressure cell of the aircraft. In this case, the energy supply device may furthermore be arranged within a casing that forms a transition between wing and fuselage.

The energy supply device may also be arranged on a fuselage section that is positioned between the wings of the aircraft. The energy supply device may be alternatively or additionally arranged on a fuselage section that is positioned between the regions, in which the landing flaps of a wing are extended.

According to the invention, an aircraft is proposed, with said aircraft featuring:
a fuselage with a fuselage section,
an energy supply device,
at least two supporting devices that are arranged on the fuselage and serve for fastening the energy supply device, and an arresting device or catching device with a first holding device arranged on the energy supply device, a second holding device arranged on at least the fuselage component or on at least one of the supporting devices and a connecting device for coupling the holding devices, wherein the mounting safety is realized in such a way that it allows operational motions and/or vibrational motions between the holding devices.

The aircraft may consist, in particular, of a monoplane with high-set wings. In this case, the energy supply device may be arranged on a fuselage section behind the wings. Due to the inventive solution or mounting device, the energy supply device is prevented from falling out of the space. This is achieved without having to take other special structural measures on the aircraft structure or on the support structure of the aircraft. This makes it possible, e.g., to prevent catastrophic damages to the aircraft and, in particular, to the landing flaps or control flaps on the wing with simple means.

The aircraft may furthermore consist of a monoplane with low-set wings. In this case, the energy supply device may be arranged, in particular, on a fuselage section above the wings.

The energy supply device provided in accordance with the invention may be formed, in particular, of:
a gas turbine engine with an output shaft, and
an air compressor that is coupled to the gas turbine engine and the drive shaft of which is coupled to the output shaft of the gas turbine.

The invention proposes, in particular, an aircraft that features a compartment for the energy supply device with an energy supply device arranged therein, as well as a supporting device for holding and fastening the energy supply device on a fuselage section in the normal operating mode, wherein only minimal structural reinforcement measures are required for mounting the energy supply device, and wherein a mounting safety is provided in order to limit and minimize damages to the structure surrounding the energy supply device in case breakage occurs on the supporting device.

BRIEF DESCRIPTION OF THE DRAWINGS

Exemplary embodiments of the invention are described below with reference to the enclosed figures, in which.

DETAILED DESCRIPTION OF THE INVENTION

According to the invention, an aircraft is provided with an energy supply device E that features, in particular, a combination of a gas turbine engine 3 and optionally a generator for generating power, e.g., for supplying aircraft systems while the aircraft stands on the ground and optionally for producing compressed air in order to start the engines. The energy supply device E may also serve for relieving the aircraft engines in-flight, particularly if an engine fails, by supplying aircraft consumers in such instances. An exhaust pipe 4, an air inlet 5 and an air compressor 6 are arranged on the energy supply device E. The energy supply device E is mounted on a fuselage section 1 of the fuselage structure at several mounting points, i.e., on at least two mounting points, by means of supporting devices A. In case of damage, the energy supply device E may separate from the fuselage or fuselage section 1 and damage the fuselage during the operation of the aircraft if a load path on the mounting device is broken.

Figure 1:
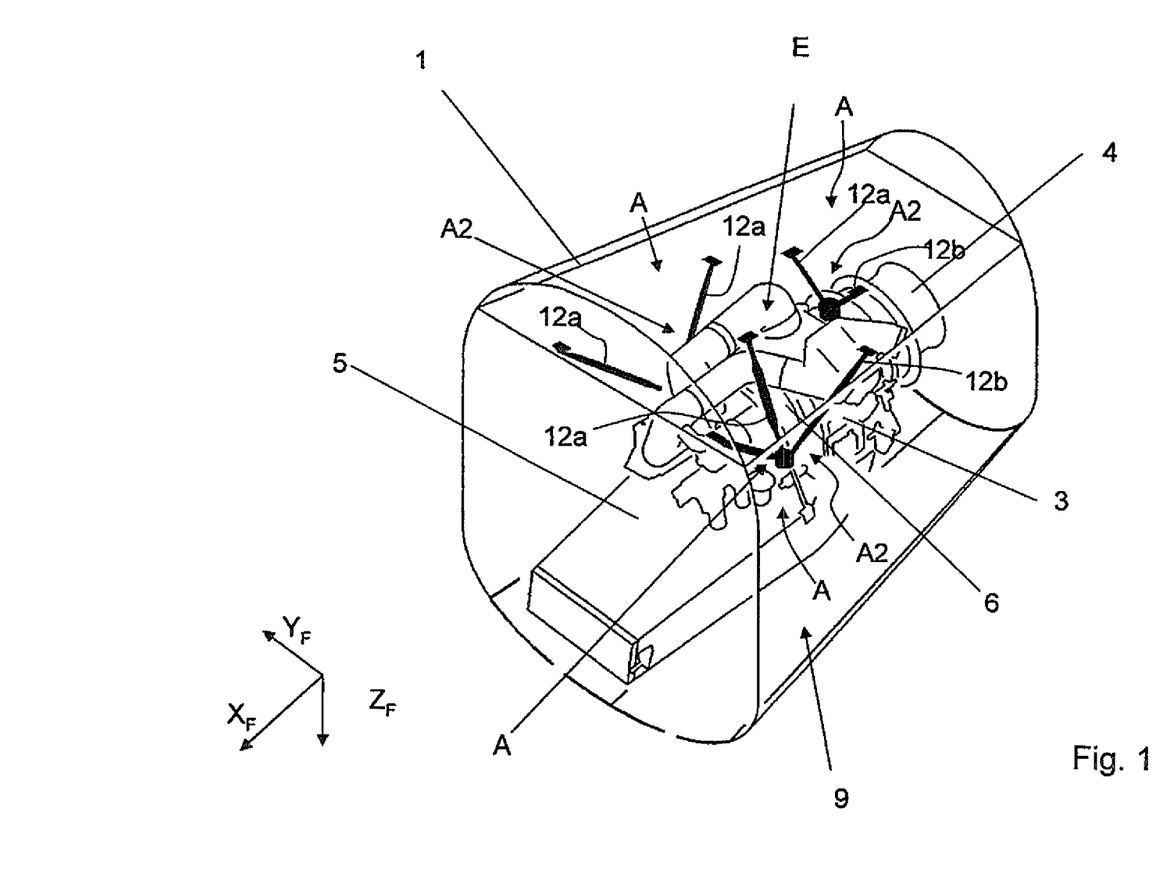
FIG. 1 shows a perspective representation of a mounting of an energy supply device in a corresponding compartment according to one exemplary embodiment of the invention in the form of an oblique top view, wherein the walls of the compartment are illustrated transparent.
Figure 2:
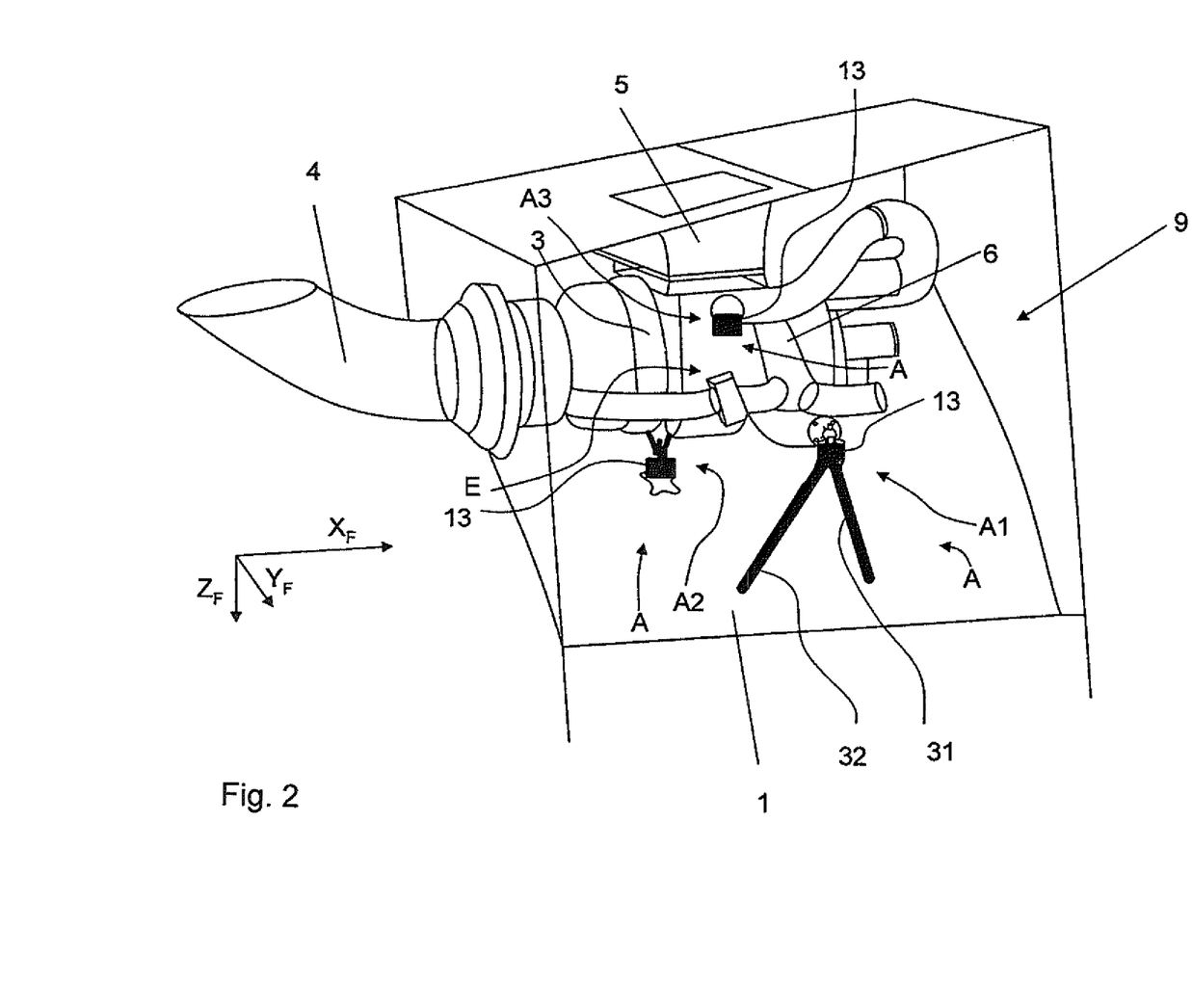
FIG. 2 shows a perspective representation of a space of an inventive aircraft, in which an energy supply device and a supporting device for fastening the energy supply device are provided.

FIG. 1 shows a space that is arranged in a component 1 of a tail of an aircraft and an energy supply device E that is arranged in said space and fastened on the component 1 by means of supporting devices A. In FIG. 2, components with functions similar to those of the components illustrated in FIG. 1 are identified by the same reference symbols.

Figure 4:
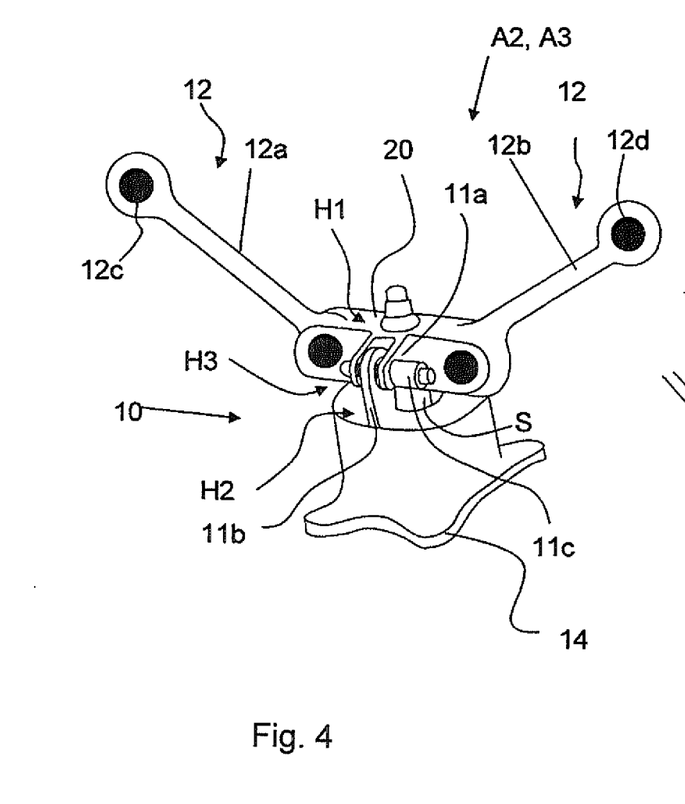
FIG. 4 shows a perspective representation of an exemplary embodiment of a supporting device for fastening the energy supply device on the fuselage that features two mounting rods, on which the energy supply device is arranged, as well as an exemplary embodiment of an inventive arresting device.
Figure 5:
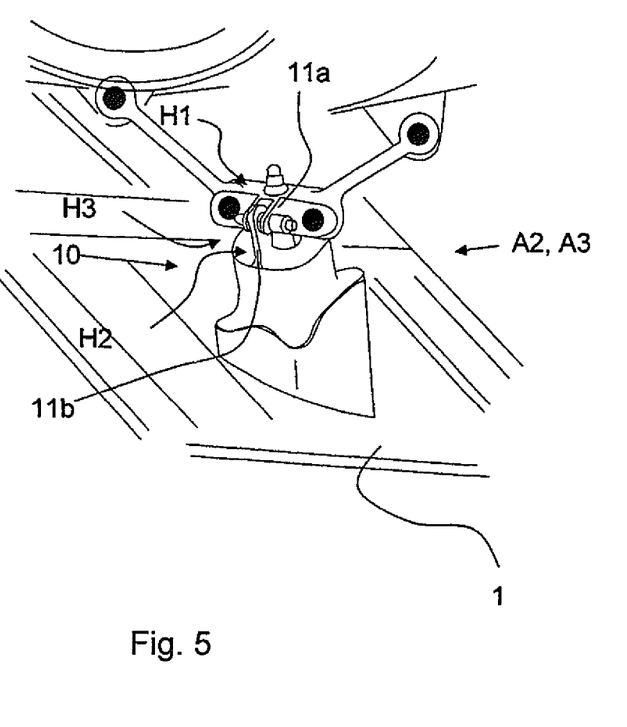
FIG. 5 shows a perspective representation of the exemplary embodiment of the supporting device according to FIG. 4, wherein the supporting device is integrated into the fuselage section.

The inventive mounting device for mounting an energy supply device E on a structural component of an aircraft features at least two supporting devices A for fastening the energy supply device E. One or more supporting devices E may be realized in the form of multi-rod devices, in particular, as illustrated in FIGS. 4 and 5.

In the exemplary embodiment of the mounting device illustrated in FIG. 1, three supporting devices A, A2 are provided and respectively realized in the form of multi-rod devices with supporting rods 12a, 12b for mounting the energy supply device E on the fuselage side. One or more supporting devices may also be realized with more than two supporting rods, particularly in accordance with FIG. 3b or 4 or 5. In one exemplary embodiment of the mounting device, at least one supporting device A mounts the energy supply device E in two space coordinates and allows one degree of freedom in one space coordinate.

In the exemplary embodiment of the mounting device illustrated in FIG. 2, three supporting devices A1, A2, A3 are provided. In this case, a first supporting device A1 forms a mounting point for the energy supply device E such that it is held in all three space coordinates. In this exemplary embodiment, a second supporting device A2 and a third supporting device A3 are also realized in the form of multi-rod devices. They may be respectively realized, in particular, such that they mount the energy supply device E in two space coordinates and allow one degree of freedom in one space coordinate. The supporting devices hold the energy supply device E in such a way that the energy supply device E is mounted thereon in a suspended fashion. According to the exemplary embodiment illustrated in FIG. 2, the supporting devices A are arranged such that they mount the energy supply device E in an upright fashion.

The terms "suspended," "upright," top" or "bottom" used in this context refer to the coordinate system of the aircraft, wherein "bottom" should, from the viewpoint of the passengers or pilot, indicate the direction toward the ground when the aircraft stands on the ground. This (downward) direction corresponds to the positive ZF-direction of a conventionally defined aircraft coordinate system. In FIGS. 1 and 2, the corresponding aircraft coordinate system is respectively plotted with XF, YF and ZF coordinate axes, wherein the XF axis is the longitudinal axis of the aircraft.

FIGS. 1 and 2 show detailed illustrations of a space 9 for an energy supply device or an APU compartment. The compartment 9 contains, among other things, the energy generating device E in the form of, e.g., a gas turbine that may be an APU or a motor. FIG. 1 shows an energy generating device E in the form of a gas turbine that is connected to and drives a generator. The generator generates power that is made available to the aircraft, particularly for supplying aircraft systems while the aircraft stands on the ground. Likewise, the energy generating device may feature a bleed air compressor for compressing air that is used, for example, for starting the main engine/s and/or routed to the aircraft cabin or other consumers. As a rule, the turbine is supplied and operated with the same fuel, wherein a tank other than the main tank can be used for this purpose. If the energy generating device E consists of the motor, it is also possible to use a fuel other than the aircraft fuel.

In the embodiment illustrated in FIG. 2, the supporting devices A respectively feature a damping device with a damper housing 13, on which the supporting arms 12a, 12b are arranged.

Figure 3A:
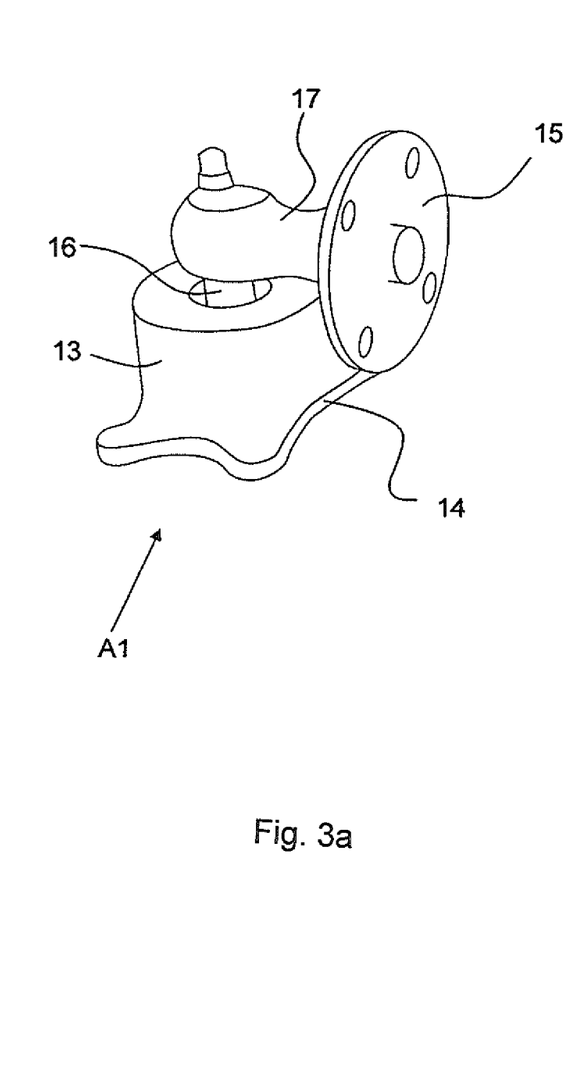
FIG. 3a shows a perspective representation of one exemplary embodiment of the supporting device for fastening the energy supply device on the fuselage, wherein the supporting device features a damping device.

FIG. 3a shows an exemplary embodiment of the supporting device A1 that connects, for example, the energy generating device E with a structural component 1 of the aircraft and may be realized, in particular, such that it forms a mounting point for the energy supply device E that holds this energy supply device in all three space coordinates. The supporting device A features a fastening plate 14 on the fuselage side and a fastening plate 15 on the supply device side. In this case, the fastening plate 14 on the fuselage side is rigidly connected to a damper housing 13 that features a conventional damping device. In this case, the damping may be realized, for example, with a compressible gas, a spring, a compact elastic body or a fluid damping system, in which a fluid is, for example, pressed from a first container into a second container through a valve when the system is subjected to a load and drawn back into the first container when the load is alleviated. A mounting rod 16 is coupled to the damper housing 13. The mounting rod 16 is also coupled to the fastening plate 15 on the supply device side by means of a supporting part 17 such that the fastening plate 14 on the fuselage side is connected to the fastening plate 15 on the supply device side by means of the mounting rod 16 and directly or indirectly by means of the damping device or the damper housing 13. An exemplary embodiment of the catching device 10 (that is not illustrated in FIG. 3a) may also be fastened on the fastening plate 15 on the supply device side or on the supporting part 17 or directly on the energy supply device E or a component fastened thereto as an exemplary embodiment of a mounting safety that, in case the supporting part 17, the mounting rod 16 or the damper housing 13 separates from the energy generating device E or the structure, ensures a continued connection between the energy generating device E and the structural component 1, arrests the energy generating device E and thusly ensures that the separation of the connection between the supporting part 17 and the energy generating device E or between the supporting part 17 and the structural component 1 does not result in the energy generating device E being unsecured and freely movable in all directions at the defective mounting point.

The supporting part 17 may be coupled to the mounting rod 16 in an articulated fashion, particularly by means of a ball-and-socket joint.

In a variation of the exemplary embodiment of the supporting device A illustrated in FIG. 3a, the energy supply device E may be arranged on the fastening plate 14 and the fastening plate 15 may be arranged on the fuselage section 1.

Figure 3B:
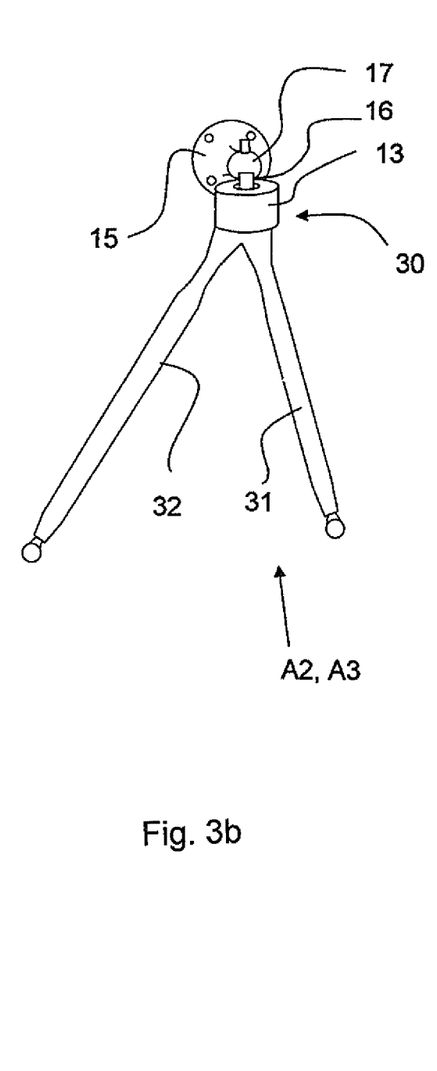
FIG. 3b shows a perspective representation of another exemplary embodiment of a supporting device for fastening the energy supply device on the fuselage, wherein this supporting device is realized with multiple rods.

Another exemplary embodiment of the supporting device A is illustrated in FIG. 3b. In the exemplary embodiment according to FIG. 3b, the supporting device features a fastening fitting 30, to which the fastening plate 15 for fastening the energy generating device E is coupled and from which the supporting rods or connecting rods 31, 32 for fastening the fastening fitting 30 on the structure side originate. The fastening of the connecting rods 31, 32 on the structure side may be respectively realized by means of a connecting element or otherwise. The fastening of the connecting rods 31, 32 on the structure side may be realized, in particular, such that they respectively form a ball-and-socket joint. According to one exemplary embodiment, the at least one supporting device A mounts the energy supply device E in two space coordinates and allows one degree of freedom in one space coordinate. A damping device with a damper housing 13 may also be integrated into the fastening fitting 30. The first holding device H1 of the arresting device 10 may be fastened on the fastening plate 14 or on the supporting part 17.

Figure 6:
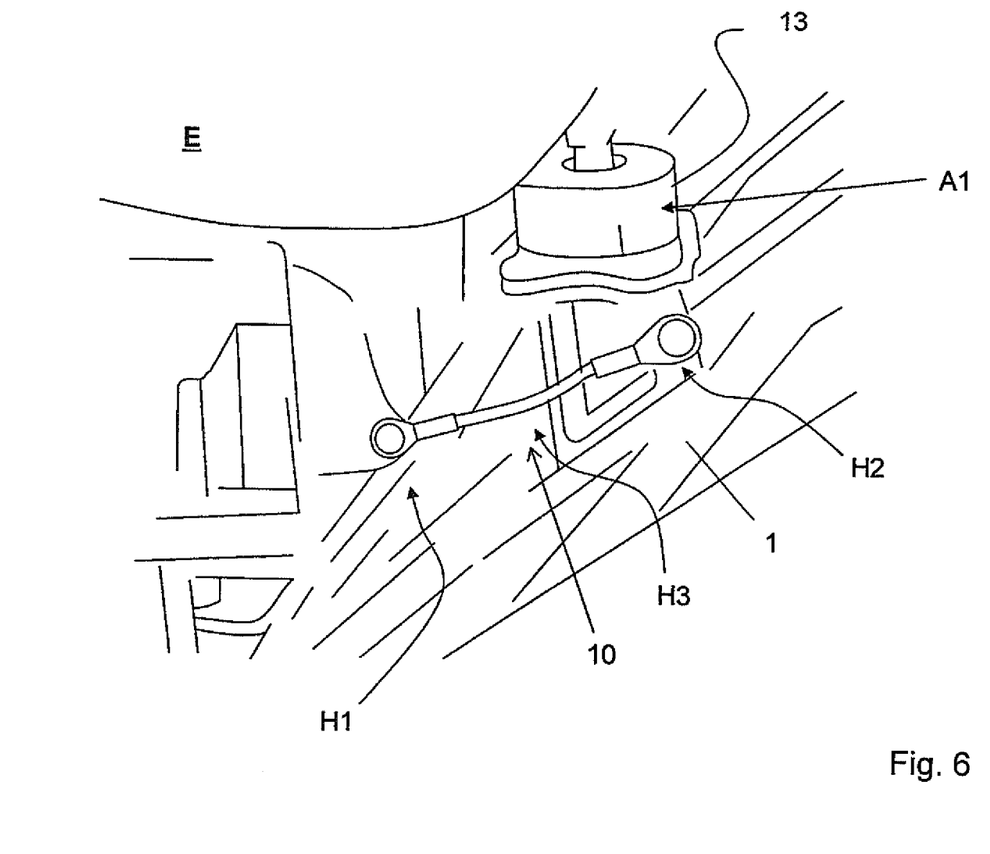
FIG. 6 shows a perspective representation of an exemplary embodiment of the supporting device that is integrated into the fuselage section, as well as another exemplary embodiment of an inventive arresting device.

According to FIG. 6, the arresting device 10 provided in accordance with the invention features a first holding device H1 that is coupled to the energy supply device E, a second holding device H2 that is coupled to at least one of the supporting devices A provided on the fuselage section 1 and a connecting device H3 for coupling the holding devices H1, H2. According to the invention, the arresting device 10 is realized in such a way that it allows operational motions and/or vibrational motions between the holding devices H1, H2. The supporting device A1 may be realized, in particular, such that it forms a mounting point for the energy supply device E that holds this energy supply device in all three space coordinates.

A supporting device A with an arresting device or mounting safety 10 is illustrated in FIGS. 4 and 5. The mounting safety is realized in such a way that it allows operational motions and/or vibrational motions of the energy supply device E relative to the structural component in one translatory direction or two translatory directions, wherein the permitted relative motions are realized such that the mounting safety holds the energy supply device E within a predetermined range of motion, in which the energy supply device E can only inflict a predetermined maximum effect upon the surrounding structure if breakage of the supporting device occurs in a predetermined load path region. The relative motions may lie, in particular, between 1 mm and 30 mm.

The first holding device H1 is formed of a fastening device or a connecting part in the form of a fastening strap or simply a strap 11a that is connected to a second holding device H2 in the form of a connecting part or a fastening device in the form of a strap or a supporting part 11b on the fastening plate 15 by means of a connecting element 11c. The connection realized with the aid of the connecting element 11c may consist, for example, of a screw connection, a riveted connection or a splint connection. A bolt connection is illustrated in FIG. 4. It would also be possible to use a different type of fastening device such as, e.g., a clamp instead of a fastening strap. In other words, this connection may consist of a separable or inseparable connection, wherein all suitable connecting options known fall under the scope of the invention. A fastening device coupled to the energy supply device E is generally coupled to a fastening device that is connected to a fastening part 14 such as, e.g., a fastening plate 14 coupled to the fuselage section 1 by means of a connecting element.

The supporting rods 12, 12a, 12b may be provided, in particular, for fastening the energy supply device E on the fuselage side. For this purpose, bearing parts 12c and 12d are respectively arranged on the ends of the supporting rods 12a, 12b and cooperate with corresponding bearing parts arranged on the structural component. In the supporting device A2 or A3 illustrated in FIGS. 4, 5, the respectively cooperating bearing parts may be realized such that they form spherical bearing. Furthermore, the mounting formed by the supporting arms 12a, 12b may be realized in the form of a mounting of the energy supply device E in two space coordinates that allows one degree of freedom in one space coordinate. In this case, the mounting safety may be realized, in particular, such that it forms a load path in the direction of the degree of freedom of the supporting device A in case breakage of the supporting device of a supporting device A occurs in a predetermined load path region.

In the exemplary embodiment of the supporting device A2 or A3 illustrated in FIGS. 4 and 5, the load path in the normal state of the supporting device, i.e., when no load path thereon is broken, extends from the fastening part 14 on the fuselage side to the structural component via a supporting device S that is rigidly arranged on the fastening part and realized, in particular, in the form of a support, the bridge H1 and the supporting arms 12a, 12b coupled thereto.

In this case, the coupling between the fastening devices is, according to the invention, realized such that they allow operational motions and/or vibrational motions between the fastening devices 11a, 11b or the holding devices H1, H2. In the exemplary embodiment illustrated in FIG. 4, the fastening strap 11a forms the connecting device H3 of the arresting device 10 together with an eyelet or recess in the supporting part 11b connected to the fastening plate 14. A connecting element 11c that protrudes through the eyelet is arranged on the fastening strap 11a. The connecting element 11c may consist, in particular, of a screw or a bolt that protrudes through a corresponding bore of the fastening strap 11a and serves as bearing for the connecting element. Depending on the design of the holding device H1, it would also be possible to provide several straps (FIG. 4). According to FIG. 4, two strap-shaped holding parts 11a are provided, in which the supporting part 11b is partially positioned, wherein the eyelet and the bore of the mounting strap overlap such that the connecting element 11c protrudes through the bore and the eyelet in order to couple the second holding device H2 to the first holding device H1. The eyelet is larger than the bore and realized such that the second holding device H2 or the supporting part is, depending on the size of the eyelet in relation to the size of the bore or the size of the cross section of the connecting element, able to move at this location and thusly allows operational motions and/or vibrational motions between the holding devices.

The fastening strap 11a and the connecting device H3 may also be realized in one piece. In this case, the connecting element 11c and the fastening device 11a may be realized, in particular, in one piece. The connecting device H3 may be realized, in particular, in the form of a wire, a cable, a chain, a band or in any other form that makes it possible to produce a connection that can be safely subjected to high tensile and bending loads.

All components of the arresting device 10 and, in particular, the connecting device H3 that is formed, in particular, of the two fastening straps 11a and the supporting part 11b in the exemplary embodiment illustrated in FIG. 5 need to have a high stability against bending loads and tensile loads. In addition, they need to be made of a material or of materials that are able to withstand a thermal load such as, for example, a fire in the compartment 9 as long as possible, i.e., they need to remain functional for the longest period of time possible. In this context, functional means that the connecting device H3 fulfills its connecting function.

The exemplary embodiment of the arresting device 10 illustrated in FIG. 5 is realized in the same fashion as the exemplary embodiment of the arresting device 10 illustrated in FIG. 4. In order to prevent the arresting device from restricting the permitted motions of the energy generating device E in the normal mode, the connecting device H3 is realized in such a way that the energy generating device E or the housing thereof can carry out motions relative to the supporting devices and/or the fuselage section 1.

The first holding device H1 and the fastening part 11a are respectively connected to a base part 20, on which holding arms 12 are arranged that are individually identified by the reference symbols 12a, 12b. The energy supply device E is in turn arranged on the holding arms 12. The holding arms 12 may be integrally connected to the base part 20 or manufactured in one piece therewith. Alternatively, the holding arms 12 may be coupled to the base part 20. In one special embodiment, only one holding arm 12 or more than the two holding arms 1 illustrated in FIG. 4 may be provided. According to the exemplary embodiment illustrated in FIG. 5, two lateral straps, from which the two supporting rods 12 originate, are realized on the base part 20 in order to connect the connecting rods 12 with the base part 20. On their ends on the side of the damper housing, the supporting rods 12 also features bores for being connected to the energy generating device E with the aid of bolts, screws, rivets or splints.

According to another exemplary embodiment, the connecting device H3 of the arresting device 10 is at least sectionally realized in a flexible fashion, wherein this flexibility is achieved, e.g., with a hose of braided wires. FIG. 6 shows such an arresting device 10 according to the invention that is fastened on a fitting of a fuselage section 1 on one side and on the energy generating device E on the other side. FIG. 6 shows an inventive arresting device 10 that is installed in a compartment and features a first holding device H2 that is connected to the energy generating device E and a second holding device H2 that is connected to a structural component 2 of the aircraft. The two holding devices H12, H2 are connected by means of the connecting device H3 in the form of, e.g., a band, a cable or a chain that may be elastic and/or expendable.

If the connecting device H3 is realized in the form of a band, cable or chain, the connecting device H3 has a greater length than necessary for connecting the fastening point or the first holding device H1 of the arresting device 10 on the energy supply device E with the fastening point or the first holding device H1 of the arresting device 10 on the structure of the aircraft, i.e., this length is greater than the distance between these fastening points. This means that a band, a chain or a cable slightly sags in this situation. When the energy supply device E moves relative to the aircraft structure due to vibrations or oscillations such that the distance between the two fastening points of the arresting device 10 is reduced, the connecting device E is able to yield further, i.e., the sag increases. If the distance between the two fastening points increases, however, the sag is reduced.

The connecting device H3 naturally may generally consists of an expendable material. This can be realized in the two-part variation of the connecting device H3, as well as in the variation of the connecting device H3 with a flexible section. In this case, the expandability may be based on the material properties of the material that connects the connecting element or realized with the constructive design of the connecting part/s of the connecting device H3. This may also be realized on the components described with reference to FIG. 5. For example, metallic elements may be connected to one another in such a way that they are elastically pretensioned, namely such that the connecting device H3 has the minimum length required for allowing the energy supply device E to carry out the above-described motions without transmitting a load or force. In the idle state of the aircraft, these elements are already slightly pretensioned against the restoring force. If the distance between the considered fastening points of the arresting device 10 increases, the connecting device H3 is able to additionally expand, wherein the connecting device H3 contracts if the distance between the fastening points is reduced.

In addition to these described embodiments of the connecting part/s 9, it is also possible to realize combinations of the described embodiments. As described above, the connecting device H3 could, for example, expand when the distance between the fastening points of the arresting device 10 increases and sag when this distance decreases.

The connecting device H3 may be formed of two parts that can be moved relative to one another. The connecting device H3 may be formed, for example, of two rods that are respectively coupled to the fastening points or holding devices H1, H2 of the arresting device 10 and may be connected thereto by means of an articulation such as, for example, a ball-and-socket joint. Due to such a connection, both rods have a freedom of motion that makes it impossible to absorb the forces that occur due to motions of the energy supply device E relative to the structure in the normal state. If the motion of the two rods should be limited or prohibited in a certain direction at one of the connecting points, this aspect can be taken into consideration in the construction and design of the respective ball-and-socket joint or the respective ball-and-socket joints, e.g., by providing corresponding limiters.

If the connecting device H3 is formed of two parts, the connecting device H3 may also be realized in such a way that one of the parts is pushed into the other part under a compressive load and pulled out of the other part under a tensile load. When one part is pulled out of the other part, the travel needs to be limited to a maximum travel that, however, is usually not reached until one of the connecting points between the energy supply device E, the arresting device and/or between the structural component and the arresting device 10 is damaged. If the arresting device 10 should also have other degrees of freedom in addition to a pure longitudinal motion, these connecting points may be once again realized in the form of articulated bearings, particularly ball bearings, as described above.

According to another aspect of the invention, a mounting device for mounting an energy supply device E on a structural component of an aircraft is proposed, with said mounting device featuring at least two supporting devices A for fastening the energy supply device E, wherein a first supporting device A1 forms a mounting point for the energy supply device E and mounts this energy supply device in all three space coordinates, wherein a catching device 10 suitable for holding the energy supply device E and for forming a safety load path in case breakage occurs on the first holding device H1 is assigned to the first supporting device A1, and wherein the connecting device H3 has, when a safety load path is formed, a length that is greater by a certain amount than the distance between the first holding device H1 and the second holding device H2 in the normal state of the first supporting device A1 and the connecting device H3 allows operational motions and/or vibrational motions of the energy supply device E relative to the structural component without damping in the normal state of the first supporting device A1, wherein at least one second supporting device A2, A3 mounts the energy supply device E in two space coordinates and allows one degree of freedom in one space coordinate, and wherein a mounting safety is assigned to the second supporting device A2, A3 and suitable for forming a load path in the direction of the degree of freedom of the supporting device A if breakage of the supporting device of a supporting device A occurs in a predetermined load path region thereof.

The invention claimed is:

1. A mounting device for mounting a piece of equipment on a structural component of an aircraft, said mounting device comprising:
    at least two supporting devices for fastening the equipment, wherein:
    the mounting device includes a catching device having a first holding device arranged on the equipment, a second holding device arranged on at least the fuselage section or at least on a first of the supporting devices, and a connecting device secured to each of the first holding device and the second holding device,
    the catching device is suitable for holding the equipment and forms a safety load path in case breakage occurs on the first supporting device,
    the connecting device is designed such that a length of a load path between the first and second holding devices is greater than a distance between the first holding device and the second holding device by a certain amount in a normal state in which the first supporting device is not broken, and the connecting device allows at least one of operational motions and vibrational motions of the equipment relative to the structural component without damping in the normal state, and
    the connecting device comprises at least one of: (i) a length-variable connecting part, (ii) a chain-like connecting part, (iii) a sectional flexible connecting part, (iv) a sectional band-shaped connecting part, (v) an expandable material, (vi) a lever arrangement that expands and contracts in an accordion-like fashion, (vii) a telescopic tube, and (viii) a sectional rod in which sections thereof are coupled in succession along a length thereof,
    wherein the first supporting device forms a mounting point for the equipment that holds the equipment in all three space coordinates, and
    wherein the second supporting device mounts the equipment in two space coordinates and allows one degree of freedom in one space coordinate.

2. The mounting device according to claim 1, wherein the catching device is realized in such a way that it forms the safety load path that acts between the structural component and the equipment and is capable of transmitting at least 500 N.

3. The mounting device according to claim 1, wherein at least one of:
    the length of the load path between the first and second holding devices is greater than the distance between the first holding device and the second holding device by at least 5%,
    a length of the catching device between a fastening point on the equipment and a fastening point on the structural component lies between 100 mm and 500 mm in the normal state of the first supporting device with the first holding device, and
    an amount, by which the length is shorter than a maximum length of the catching device between the fastening points when the catching device forms the safety load path, lies between 1 mm and 100 mm.

4. The mounting device according to claim 1, wherein the operational motions and vibrational motions lie between 1 mm and 30 mm.

5. The mounting device according to claim 1, wherein the at least one supporting device includes a damping device for damping vibrations of the equipment relative to the fuselage section.

6. The mounting device according to claim 1, wherein:
    the mounting device is formed of a first connecting part and a second connecting part, wherein the first connecting part is fastened on at least one of the supporting devices, on a damper housing, and the fuselage section and the second connecting part is fastened on the equipment, and
    the connecting parts are coupled in such a way that the connecting parts are movable relative to one another.

7. The mounting device according to claim 6, wherein the connecting parts are coupled to one another by means of a bolt-eyelet connection such that the connecting parts are movable relative to one another.

8. The mounting device according to claim 1, wherein the mounting device forms a load path in a direction of a degree of freedom of the supporting device if breakage of the supporting device occurs in a predetermined load path region thereof.

9. The mounting device according to claim 1, wherein:
    the supporting device includes a fastening part on the fuselage side, a supporting part arranged thereon and at least two supporting rods arranged thereon, and
    a respective bearing part is arranged on respective ends of the supporting rods and form a spherical bearing together with a corresponding bearing point of the equipment.

10. An aircraft, comprising:
    a fuselage with a fuselage section that features a space,
    a piece of equipment arranged in the space, and
    a mounting device that is realized in accordance with claim 1.

11. The aircraft according to claim 10, wherein the supporting devices are arranged such that they mount the equipment in an upright fashion.

12. The aircraft according to claim 10, wherein the supporting devices are arranged on an upper side of the fuselage section.

13. The aircraft according to claim 12, wherein the space, in which the equipment is arranged, lies between a wing section, a fuselage section and a casing part that forms a transition between wing and fuselage.

14. The aircraft according to claim 10, wherein the aircraft is a monoplane with high-set wings.

15. The aircraft according to claim 10, wherein the space is arranged in a tail region of the aircraft.

16. The aircraft according to claim 10, wherein the equipment includes:
a gas turbine engine with an output shaft, and
an air compressor that is coupled to the gas turbine engine and a drive shaft of which is coupled to the output shaft of the gas turbine.

17. A mounting device for mounting an energy supply device on a structural component of an aircraft, the mounting device comprising:
at least two supporting devices that serve for fastening the energy supply device and are respectively provided for transmitting supporting forces occurring between the structural component and the energy supply device, and
a mounting safety for providing a safety load path in case breakage occurs on the first supporting device, wherein:
a first supporting device forms a mounting point for the energy supply device that holds the energy supply device in all three space coordinates,
the safety device is disposed at the first supporting device for holding the energy supply device at the first supporting device in case breakage occurs on the first supporting device, the safety device providing a safety path in which the mounting safety holds the energy supply device within a predetermined range of motion,
at least a second supporting device is provided that holds the energy supply device in two space coordinates and allows one degree of freedom in a third space coordinate,
wherein the safety device is realized as catching device having a variable length.

18. The mounting device according to claim 17, wherein:
the catching device includes a first holding device arranged on the energy supply device, a second holding device arranged on the first supporting device, and a connecting device for connecting the first and second holding devices together, and
the connecting device is designed such that a length of a load path between the first and second holding devices is greater than a distance between the first holding device and the second holding device by a certain amount in a normal state in which the first supporting device is not broken.

19. The mounting device according to claim 17, wherein the connecting device comprises at least one of: (i) a length-variable connecting part, (ii) a chain-like connecting part, (iii) a sectional flexible connecting part, (iv) a sectional band-shaped connecting part, (v) an expandable material, (vi) a lever arrangement that expands and contracts in an accordion-like fashion, (vii) a telescopic tube, and (viii) a sectional rod in which sections thereof are coupled in succession along a length thereof.

20. The mounting device according to claim 17, wherein the supporting device includes a damping device for damping vibrations of the energy supply device relative to the fuselage section.

21. The mounting device according to claim 17, wherein:
the mounting device is formed of a first connecting part and a second connecting part, wherein the first connecting part is fastened on at least one of the supporting devices, on a damper housing, and the fuselage section and the second connecting part is fastened on the device, and
the connecting parts are coupled in such a way that the connecting parts are movable relative to one another.

* * * * *